United States Patent
Ikezoe et al.

(10) Patent No.: US 8,999,597 B2
(45) Date of Patent: Apr. 7, 2015

(54) FUEL CELL

(75) Inventors: Keigo Ikezoe, Yokohama (JP); Mitsutaka Abe, Yokohama (JP); Takanori Oku, Yokohama (JP); Yasuhiro Numao, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 209 days.

(21) Appl. No.: 13/697,486

(22) PCT Filed: Apr. 19, 2011

(86) PCT No.: PCT/JP2011/059613
§ 371 (c)(1),
(2), (4) Date: Nov. 30, 2012

(87) PCT Pub. No.: WO2011/158551
PCT Pub. Date: Dec. 22, 2011

(65) Prior Publication Data
US 2013/0071769 A1 Mar. 21, 2013

(30) Foreign Application Priority Data
Jun. 15, 2010 (JP) ................................. 2010-136228

(51) Int. Cl.
*H01M 8/02* (2006.01)
*H01M 8/24* (2006.01)
*H01M 8/10* (2006.01)

(52) U.S. Cl.
CPC ............ *H01M 8/242* (2013.01); *H01M 8/1004* (2013.01); *H01M 8/0254* (2013.01); *H01M 8/1002* (2013.01); *H01M 8/0273* (2013.01); *H01M 8/0276* (2013.01); *H01M 2008/1095* (2013.01); *Y02E 60/50* (2013.01)

(58) Field of Classification Search
CPC ............ H01M 8/0276; H01M 8/1002; H01M 8/1006; H01M 2/0254
See application file for complete search history.

(56) References Cited

U.S. PATENT DOCUMENTS

| 2002/0102453 | A1 | 8/2002 | Suenaga et al. | |
|---|---|---|---|---|
| 2002/0122970 | A1* | 9/2002 | Inoue et al. | 429/35 |
| 2007/0207365 | A1* | 9/2007 | Ohnuma | 429/38 |
| 2008/0026279 | A1* | 1/2008 | Kobuchi et al. | 429/35 |
| 2008/0280180 | A1* | 11/2008 | Correa et al. | 429/30 |

(Continued)

FOREIGN PATENT DOCUMENTS

| JP | 2001-081589 | 3/2001 |
|---|---|---|
| JP | 2003-077499 | 3/2003 |

(Continued)

*Primary Examiner* — Ula C Ruddock
*Assistant Examiner* — Scott J Chmielecki
(74) *Attorney, Agent, or Firm* — Young Basile

(57) ABSTRACT

Disclosed is a fuel cell provided with a membrane electrode structure having a frame, two separators that sandwich the membrane electrode structure therebetween, and gas seals between the end portion of the frame and the end portions of respective separators, and diffuser sections for distributing a reacting gas to between the frame and respective separators. In the diffuser section on the cathode side, the frame is provided with a protruding section in contact with the separator, and in the diffuser section on the anode side, the frame and the separator are disposed by being spaced apart from each other, thereby excellently maintaining contact surface pressure between the membrane electrode structure and the separators, and preventing contact resistance from being increased.

8 Claims, 12 Drawing Sheets

(56) References Cited

U.S. PATENT DOCUMENTS

| | | |
|---|---|---|
| 2009/0042086 A1 | 2/2009 | Ishikawa et al. |
| 2009/0075134 A1* | 3/2009 | Tanaka et al. ............ 429/19 |
| 2009/0246586 A1 | 10/2009 | Kawabata et al. |
| 2009/0311563 A1* | 12/2009 | Raiser et al. ............ 429/13 |
| 2010/0159344 A1* | 6/2010 | Gottmann et al. ........ 429/469 |
| 2011/0027683 A1* | 2/2011 | Ortiz ..................... 429/479 |
| 2011/0287336 A1* | 11/2011 | Himeno et al. .......... 429/492 |
| 2012/0258379 A1* | 10/2012 | Fukuta et al. ........... 429/457 |

FOREIGN PATENT DOCUMENTS

| | | |
|---|---|---|
| JP | 2007-157578 | 6/2007 |
| JP | 2008-047295 | 2/2008 |
| JP | 2009-009912 | 1/2009 |
| JP | 2009-076294 | 4/2009 |
| JP | 2010-136228 | 6/2010 |

* cited by examiner

FUEL CELL

TECHNICAL FIELD

The present invention relates to a fuel cell (unit cell) used as a fuel cell power generating element. In particular, the present invention relates to a fuel cell that makes up a fuel cell stack by stacking multiple sheets thereof.

BACKGROUND

The fuel cell described in Japanese Patent Application Publication JP 2003-077499 A is provided with a membrane-electrode-assembly (MEA) in which an electrolyte film is sandwiched between a fuel electrode and an air electrode, a resin frame surrounds the periphery of the MEA, and a pair of separators sandwich both the MEA and the resin frame. Both the fuel electrode and the air electrode are provided with a gas diffusion layer on their outside.

In addition, in the fuel cell, between the resin frame and both separators are provided a manifold portion and a flow rectifier or distribution portion, respectively. Moreover, projections are provided on both sides of the resin frame to hold the necessary gas flow height by contacting each separator. Thus, the fuel cell circulates reactant gas (fuel gas and oxidant gas) through the membrane-electrode-assembly. The separator is also used for a current collector and external terminal in addition to functioning as a gas seal for the reactant gas.

The above fuel cell is configured to make up a fuel cell stack by stacking multiple sheets. When configuring this fuel cell stack, pressure is exerted in the stacking direction in order to maintain good assembly accuracy, gas seal property and electrical conductivity.

BRIEF SUMMARY

However, in the conventional fuel cell such as those described above, due to a structure in which each separator is in contact with both the membrane-electrode-assembly and resin frame, when stacked and pressurized, the contact portion between the projection of resin frame and each separator is subject to pressurized force. A so-called localized reduction in contact surface-pressure is encountered so that a contact pressure between the MEA and each separator will not be obtained in a sufficient manner with the problems of increased contact resistance and associated deterioration of battery performance.

This happens in the fuel cell due to manufacturing tolerances in terms of thickness and collapse characteristics of the gas diffusion layer making an electrode. Therefore, in a fuel cell stack in which such individual fuel cells are stacked or laminated on one another, it may be difficult to optimize the contact pressures appropriately between the MEAs and separator with respect to all fuel cells while maintaining the projection of the resin frame in contact with separators on both sides thereof.

The present invention has been made focusing on the above-mentioned problems of the conventional technology. It is intended to provide a fuel cell with an MEA together with a frame around its periphery and two sheets of separators sandwiching the frame and the MEA, when configuring a fuel cell stack by stacking multiple sheets thereof, in which the contact pressure between the MEA and separator may be maintained appropriately and increases in the contact resistance are avoided.

A fuel cell is provided with a membrane-electrode-assembly (MEA) having a frame body around its periphery, a pair of separators sandwiching the frame and MEA, a gas seal between a periphery portion of frame and the separator along with respective diffusers between the frame and each separator for distributing or circulating reactant gas. In addition, in the fuel cell, on either side of the diffuser of both the cathode side and anode side, at least on either surface of the frame or separator opposing each other, projections are provided for contact with the counterpart.

Moreover, on the other side of the diffuser, the frame and the separator are configured to be spaced apart from each other, and through these configurations means are provided for solving the conventional problem.

In addition, the fuel cell is characterized in that, as a preferred embodiment, the above-mentioned projection or protrusion is provided on either on the frame or separator in the diffuser section on the cathode side.

According to the fuel cell of the present invention, since the frame may be displaceable toward the other diffusion side without being fully constrained, when configuring a fuel cell stack by stacking multiple sheets, the pressurized force along a stacking direction is applied effectively between the MEA and separator and thus the contact pressure between the MEA and separator may be maintained appropriately, along with a obtaining good battery performance while avoiding increase in contact resistance.

BRIEF DESCRIPTION OF THE DRAWINGS

The description herein makes reference to the accompanying drawings wherein like reference numerals refer to like parts throughout the several views, and wherein.

DETAILED DESCRIPTION

FIGS. 1 through 4 are diagrams illustrating one embodiment of a fuel cell according to the present invention. A fuel cell FC shown in FIG. 1 to 33 has a membrane-electrode-assembly (MEA) 2 with a frame 1 around the periphery thereof, and two sheets of separators 3, 3 sandwiching the frame 1 and MEA 2. Frame 1 is shaped in a thin plate of approximately constant thickness and for the most part thereof is made thinner than the MEA except for the periphery portions. In addition, a distribution region (a diffuser portion as described below) is provided to distribute or circulate reactant gas between frame 1 and separator 3, 3. Note that, for easiness of production, it is desirable to make frame 1 of resin while separator 3 is of metal in view of manufacturability.

Figure 4:
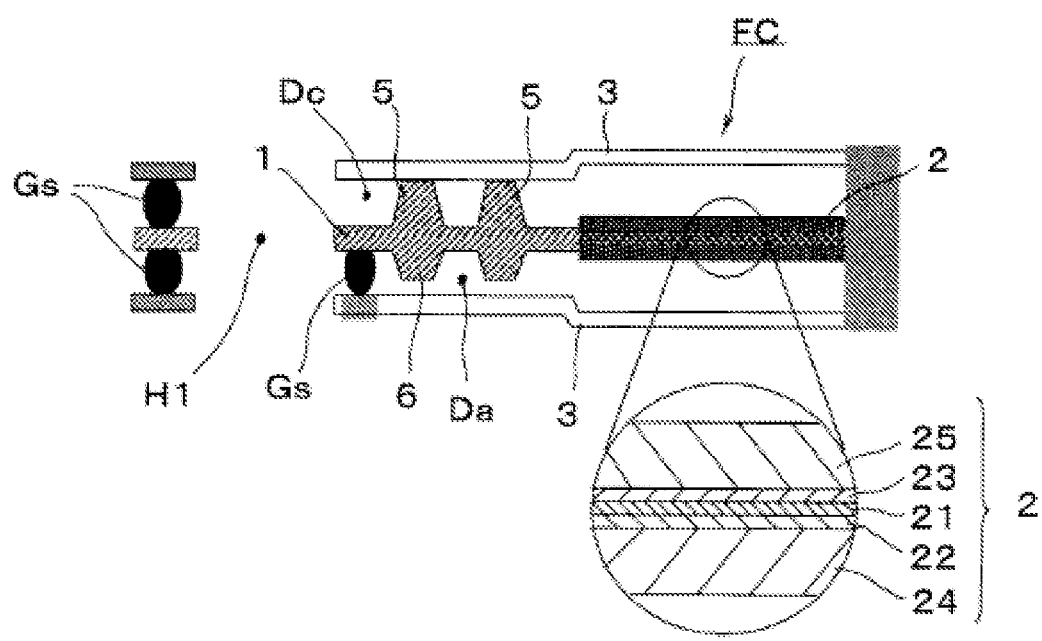
FIG. 4 is a cross-sectional view based on the line A-A in FIG. 2 showing an embodiment of the fuel cell.

The MEA 2 is configured, as shown in an enlarged view in FIG. 4, to have an electrolyte layer 21 consisting of, for example, solid polymer sandwiched between the fuel electrode layer (anode) 22 and an air electrode layer (cathode) 23. In addition, the MEA 2 shown on a surface of fuel electrode layer 22 and an air electrode layer 23 a gas diffusion layer 24, 25, are provided respectively, consisting of carbon paper or porous material.

Also, in the MEA 2, the fuel electrode layer 22 is supplied with fuel gas (hydrogen) while air electrode layer 23 is supplied with another reactant oxidant gas (air) to cause a power generation by electrochemical reaction. The MEA may omit the gas diffusion layer so as to be consisting of an electrolyte layer 21, fuel electrode layer 22 and air electrode layer 23.

The frame 1 is integrated with the MEA 2 by way of a resin molding (injection molding, for example). In this embodiment, the membrane electrode structure 2 is placed in the center with a rectangular shape. In addition, frame 1 is formed, at both end portions, respectively with three manifold holes H1 to H6. In areas ranging from each group of manifold holes through the membrane electrode structure 2 present a distribution or circulation area of reactant gas. The frame 1 and both separators 3, 3 are each in a rectangular shape with approximately the same longitudinal and width dimensions.

Each separator 3 is formed by press molding of a metal plate such as stainless steel. Each separator 3 is configured such that the central part corresponding to the MEA 2 is formed in waveform or corrugated shape in a cross section along the short-side direction. The corrugated shape is continuous along the direction of a long side. Thus, each separator 3 has, at a center portion corresponding to the MEA, each projection or protruding portion of the corrugation in contact with MEA 2 and each recess or concave portion of the corrugation forms a flow path of reactant gas.

It should be noted that in FIG. 4, since the cross section along the recess portion (gas flow path) of corrugation of separator 3 is illustrated, it appears that MEA 2 is set apart from both separators 3, 3. However, as described above, both MEA 2 and separators 3 are in contact with each other.

In addition, each separator 3 has, at both ends, manifold holes HI to H6 similar to each manifold hole H1 to H6 of frame 1. The area extending between each group of manifold holes to the corrugated cross sectional portion is an area for a reactant gas distribution area.

Figure 2:
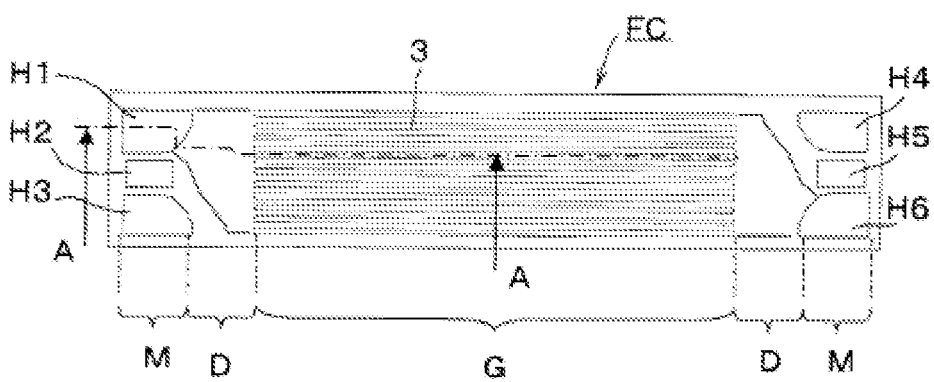
FIG. 2 is a plan view of a fuel cell.

The above mentioned frame 1, MEA 2 and both separators 3, 3, when stacked or laminated, makes up a fuel cell FC. In this configuration, fuel cell FC is provided as shown in FIG. 2 in particular, with a power generation unit G corresponding to the area of MEA 2. Also, at both sides of power generation unit G, manifold portions M, M for supply and discharge of reactant gas as well as diffuser portion D, D for distribution area of reactant gas extending from each manifold portion M to power generation unit G.

It should be noted that diffuser portion D is formed not only at both ends of cell in FIG. 2 but also formed between frame 1 and both separators 3, 3, in other words, both on anode side (Da) and cathode side Dc), respectively.

Each of manifold holes H1 to H3 on one side of manifold portion M shown on the left side in FIG. 2 is intended for an oxidant gas supply (H1), cooling fluid supply (H2) and fuel gas supply (H3), respectively, and each flow path is formed in a stacking direction. Also, each of manifold holes H4 to H6, as shown on the right side of FIG. 2, is for fuel gas discharge (H4), cooling fluid discharge (h5) and oxidant gas discharge (H6), respectively and forms respective flow path in a stacking direction. In addition, regarding the holes for the supply and discharge, some or all may be located in the reversed relationship.

In addition, in the cell FC fuel cell, as shown in FIG. 4, between frame 1 and a separator 3, a gas seal is provided on the periphery of the manifold hole H1 and on the periphery of the separator 3. In addition, in a state where a plurality of sheets of fuel cells is stacked, a further gas seal Gs is provided between adjacent separators 3. In this embodiment, a structure in which cooling fluid is distributed between adjacent separator 3, 3. In addition, when the separator 3 has a function of the current collector and the external terminal, an insulator is interposed between the separators 3.

The above described gas seal Ga separates respective distribution areas of fuel gas, oxygen gas and cooling fluid from one another air-tightly between individual layers while assuring a flow path of prescribed fluid between the layers. For this purpose, at appropriate locations of the periphery portions of manifold holes H1 to H6 are provided with openings.

In other words, in FIG. 4, because manifold hole H1 for oxidant gas supply is shown, an opening of gas seal Gs is provided on an cathode side (upper side), and anode side (lower side) is closed by gas seal Gs. According to a fuel cell FC provided with the structure mentioned above, by stacking multiple sheets, a fuel cell stack is configured as shown in FIGS. 3A and B.

Figure 3A:
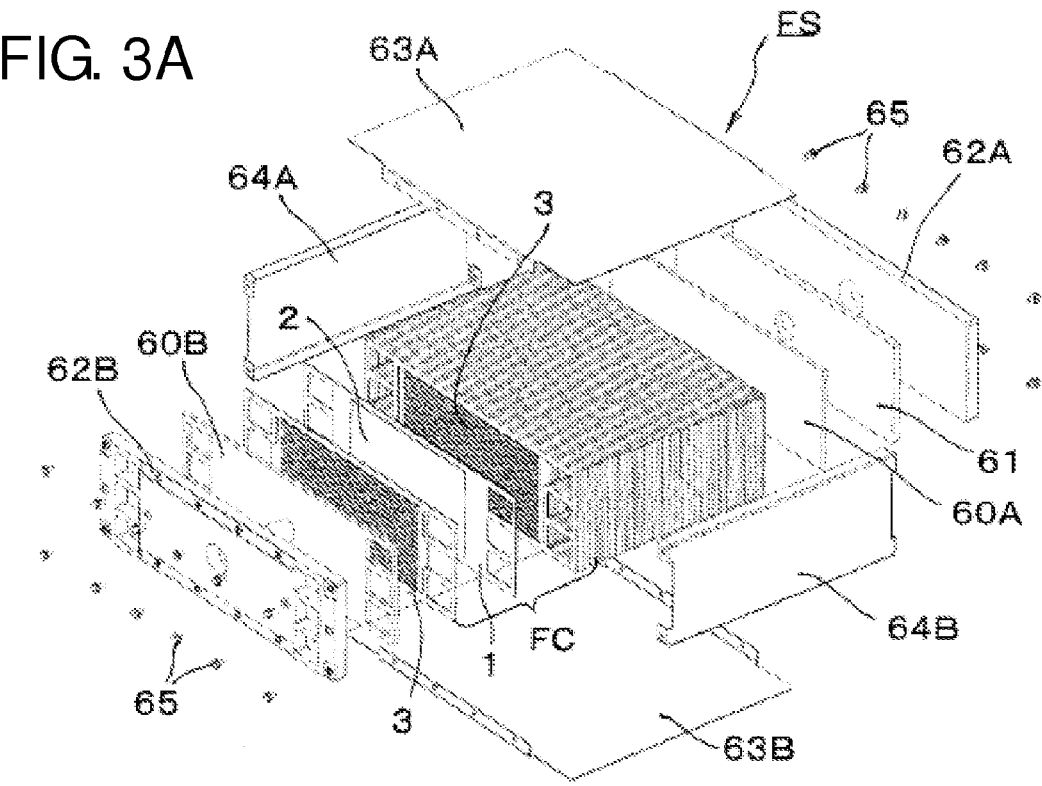
FIG. 3A is a view of a fuel cell stack composed of multiple fuel cells stacked and explains a perspective view of a disassembled state.

As shown in FIG. 3A, fuel cell stack FS has at one end of the stacking direction (right end portion in FIG. 3A) an end plate 62A with collector 60A and spacer 61 interposed, while at the other end, an end plate 62B with collector 60B interposed. In addition, fuel cell stack FS are provided on both faces representing a long side of fuel cell C (upper and lower faces in FIG. 3A) with fastener plates 63A, 63B, respectively, while on both faces representing a short side of fuel cell C with reinforcing plates 63A, 63B, respectively.

Figure 3B:
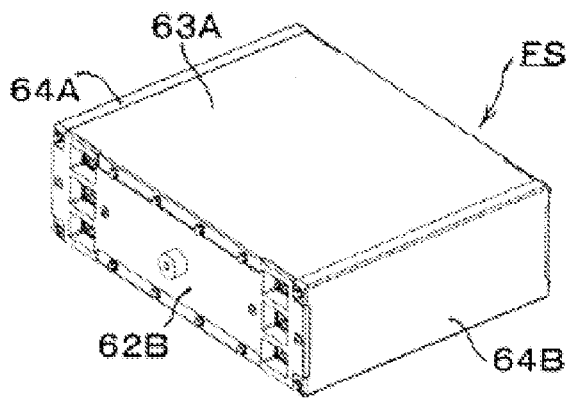
FIG. 3B is a view of a fuel cell stack composed of multiple fuel cells stacked and explains a perspective view of an assembled state.

In addition, in the fuel cell stack FS, each fastener plates 63A, 63B and reinforcing plates 64A, 64B are fastened to both end plates 62A, 62B via bolt 65. In this way, the fuel cell stack represents an integrated structure with a case, as shown in FIG. 3B and by applying a restraint pressurized force on each fuel cell FC in a stacking direction and thereby applying a predetermined contact pressure to each fuel cell FC to maintain gas seal property, conductivity and the like appropriately.

Here, in the fuel cell FC, at a diffuser portion on one of the anode side and cathode side, on at least one surface of frame 1 and separator 3 opposing to each other, a projection or protrusion 5 is provided for contact with the counterpart. Also, on the diffuser on the other side, frame 1 and separator 3 are arranged spaced apart from each other.

In the fuel cell FC according to this embodiment, as shown in FIG. 4, at diffuser portion Dc on cathode side, frame 1 is formed with a projection 5 for contact with a counterpart, separator 3. Also, at diffuser portion Da on anode side, frame 1 is spaced apart from the opposing separator 3.

Figure 1:
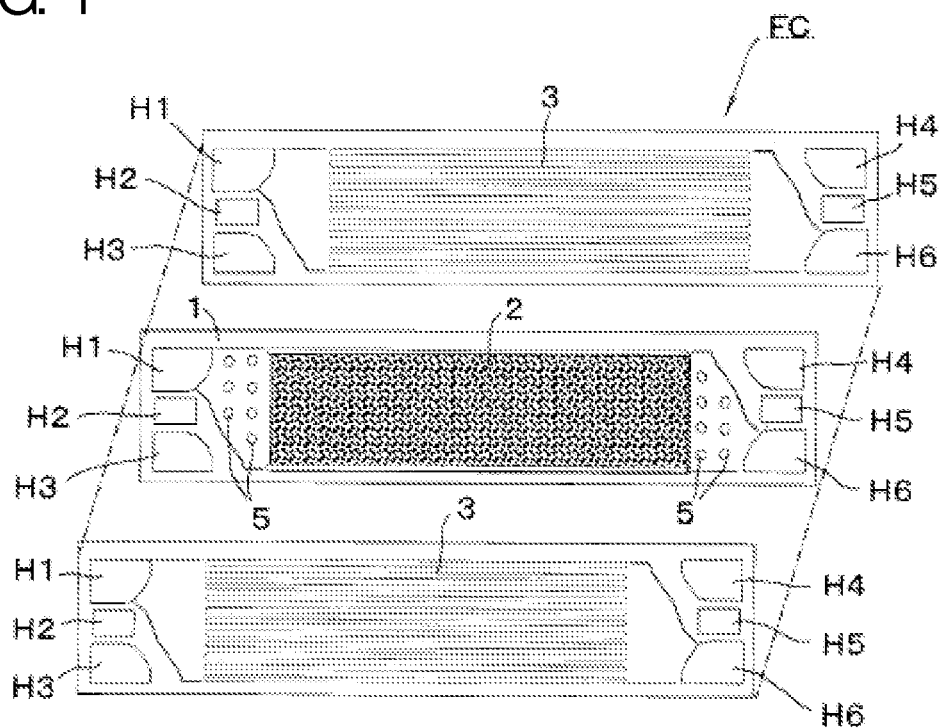
FIG. 1 is a plan view of one embodiment of the fuel cell according to the present invention with a fuel cell described in a disassembled state.

The projections 5 represent a frusto-conical shape and are formed integral with resin frame 1, and are arranged with preset intervals shown in FIGS. 1 and 2. The projections 4 are not particularly limited in shape, but it is sufficient to have such configuration which does not preclude the distribution of reactant gas.

Moreover, in this embodiment, the surface on the anode side of frame 1 (lower side surface in FIG. 4) is provided with convex portion 6 similar in shape to projection 5. This convex portion 6 is lower in height than the projection 5 and leaves a gap to the separator 3 so that, when the frame 1 and separator 3 displace in mutually approaching direction, convex portion 6 abuts on separator 3 for preventing excessive displacement.

For the fuel cell FC with the above described construction, when forming a fuel cell stack FS by stacking multiple sheets, the pressurized force in the stacking direction is applied effectively between the MEA 2 and each separator 3,3.

In other words, in the fuel cell FC, in the anode side diffuser portion Da, frame 1 is separated from separator 3. Thus the pressurized force in the stacking direction will exert only between MEA 2 and separator 3 so that the contact pressure may be maintained sufficiently between MEA 2 and separator 3.

In addition, in the fuel cell FC, although in the diffuser portion Dc on the cathode side, projection 5 of frame 1 and separator 3 in contact with each other, frame 1 is not restrained on the anode side. Therefore, even upon application of force in the stacking direction, frame 1 may be displaceable to the anode side and thus maintain the contact pressure between MEA and separator 3 within an appropriate range without significant reduction thereof.

In this way, in the cell FC, since the frame 1 is displaceable toward a diffuser portion on the other side (Da) without being restrained on both surfaces completely, when configuring a fuel cell stack by stacking multiple sheets, a good contact pressure between MEA 2 and each separator 3, 3 may be maintained. It is thus possible to obtain a good battery performance by preventing the increase in contact resistance. Therefore, in the fuel cell stack FS, i.e., a laminated body of fuel cells FC, it is possible to obtain efficient power generation function over a long period of time.

In addition, as in the fuel cell FC of the above-described embodiment, when projection 5 is provide in frame 1 on the cathode side diffuser portion Dc, it is very effective to address the variability or uneven dispersion of flow rate of reactant gas. This is because, in the fuel cell FC, oxidizing gas on the cathode side contains more impurities other than oxygen, the volumetric flow required for power generation is larger and, in order for the electrochemical reaction (electrode reaction) in the MEA 2 to stabilize, the dispersion or variations in the flow of oxygen gas on cathode side is likely to occur.

Thus, in the fuel cell FC, as shown in FIG. 4, in the cathode side diffuser Dc, frame 1 is provided with projection 5 contacting separator 3. In contrast, in the anode side diffuser where dispersion in flow of fuel gas is less likely to occur, frame 1 is space apart from separator 3. Therefore, in the fuel cell FC, even when variations or uneven dispersion of exigent gas in diffuser portion Dc at cathode side occurs, the height of diffuser portion Dc on cathode side will be continuously maintained constant by projection 5 for suppressing a pressure loss.

Thus, in the fuel cell FC in the above described embodiment, the contact pressure between MEA 2 and both separators 3, 3 is kept in good condition for preventing increase in contact resistance as well as another function for coping with the unevenness or variations of reactant gas flow will be even more effective, as described below on the operating method of fuel cell system, by increasing a gas pressure in a diffuser portion formed by spacing frame 1 and separator 3 apart.

Figure 5:
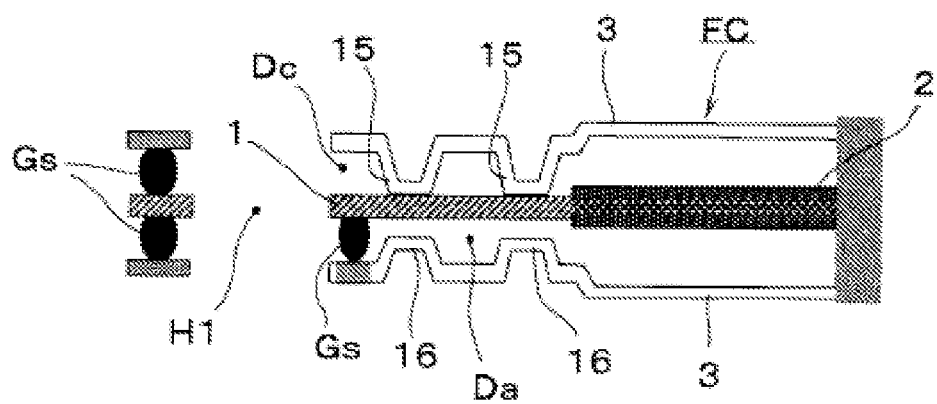
FIG. 5 is a cross-sectional view based on the line A-A in FIG. 2 showing another embodiment of the fuel cell.
Figure 6:
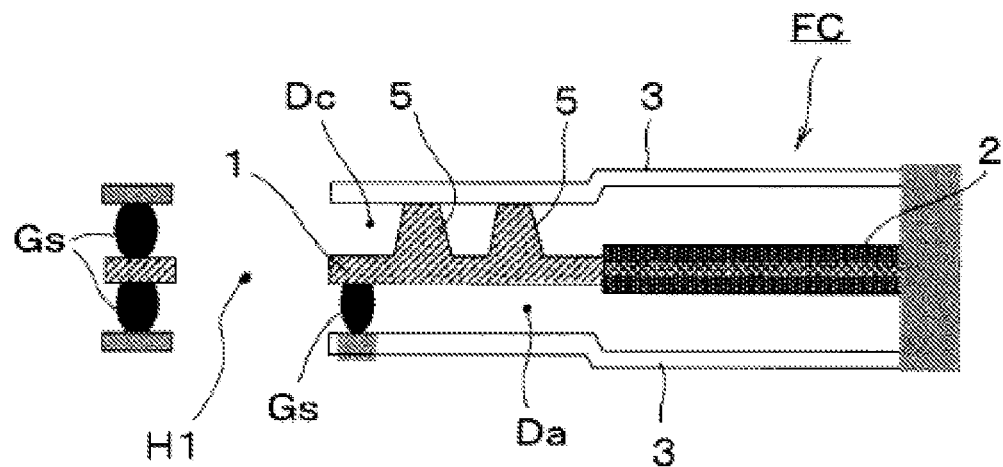
FIG. 6 is a cross-sectional view based on the line A-A in FIG. 2 showing still another embodiment of the fuel cell.
Figure 7:
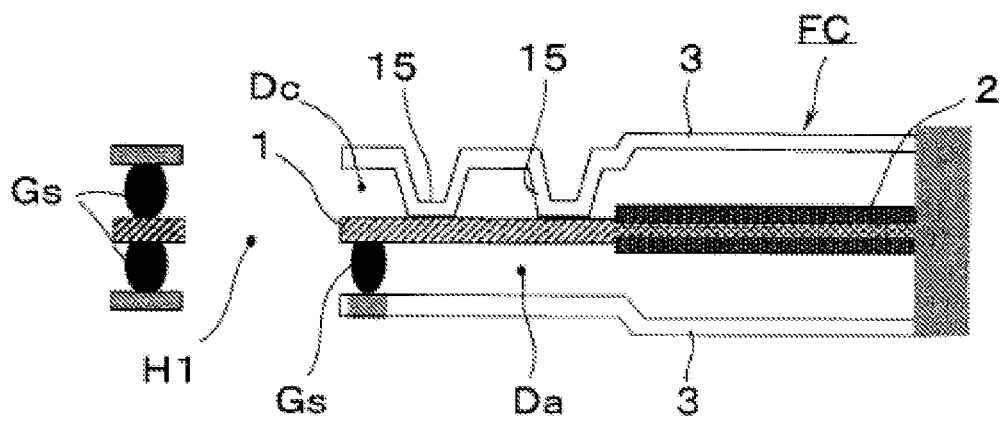
FIG. 7 is a cross-sectional view based on the line A-A in FIG. 2 showing yet another embodiment of the fuel cell.

FIGS. 5 through 7 show diagrams illustrating other embodiments of the fuel cell according to the present invention. The same part of configuration as the previous embodiment will be omitted for a detailed description by attaching the same reference numerals.

In the fuel cell FC shown in FIG. 5, in a diffuser portion Dc of the cathode side, projection 15 is provided on separator 3 in contact with the frame 3 while in a diffuser portion Da on the anode side, frame 1 and separator 3 are arranged with spaced apart from each other.

In addition, on the anode side separator 3 shown in the figure, the convex portion 16 is provided lower than the projection. This convex portion 16 forms, as in the case of the previous embodiment, a gap to separator 3, and, when frame 1 and separator 3 are displaced in mutually approaching direction, abutment on separator 4 is created for preventing an excessive displacement.

The fuel cell FC cell shown in FIG. 6 is equipped with a basic configuration comparable to those of the embodiment shown in FIG. 4, and in diffuser portion Da of the anode side, frame 1 is formed flat without convex portions (6). In addition, the fuel cell FC shown in FIG. 7 is equipped with a basic configuration comparable to those of the embodiment shown in FIG. 5, in a diffuser portion or section of the anode side, separator 3 is formed with a flat surface, i.e., no convex portions (16).

Even in each of the above fuel cells FCs, along with the same implementation and effect obtained similar to the previous embodiment, a fuel cell stack FS is configured by stacking multiple sheets. Also, as in the fuel cell FC shown in FIG. 6 and FIG. 7, if frame 1 or separator 3 is formed with a flat surface, along with reduction in pressure loss in anode side diffuser portion Da, it also contributes to the reduction of processing costs of frame 1 or separator 3.

Figure 8:
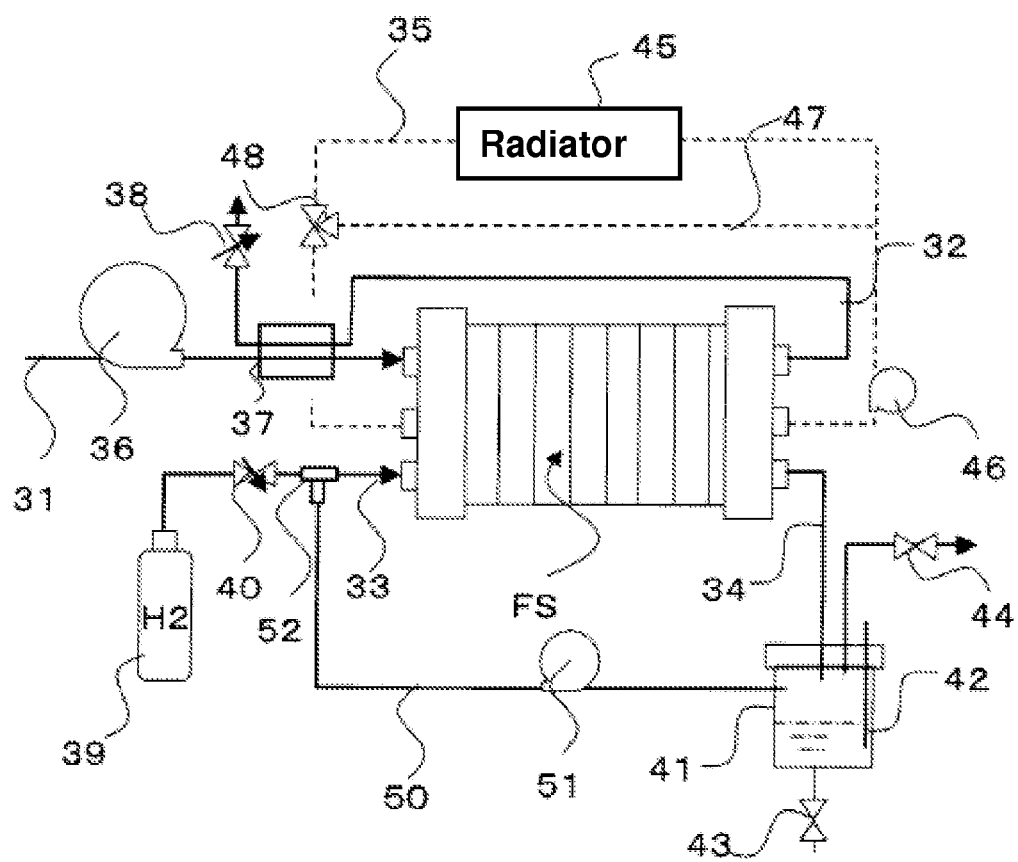
FIG. 8 is an explanatory diagram showing an example of a fuel cell system.

FIG. 8 is a diagram illustrating a fuel cell system equipped with a fuel cell stack FS. Fuel cell stack FS is assembled by stacking in multistage of fuel cells FC shown in FIGS. 4 to 7 and pressurize so as to be assembled to maintain that pressurized state.

In the fuel cell system shown in the figure, for the fuel cell stack FS, a supply passage 31 and discharge passage 32 of the oxidizing gas, supply passage 33 and discharge passage 34 of fuel gas, and cooling fluid circulation passage 35 are provided.

An air supply means 36 such as a compressor and a humidifier 37 to humidify the supply air from the air supply means 36 are disposed in oxidizing gas supply passage 31. In addition, exhaust passage 32 of oxidizing gas supplies water vapor contained in air emissions to humidifier 37 and will be open to the atmosphere by a back pressure regulating valve 38.

The fuel gas supply passage 33, which leads from hydrogen tank 39 to the fuel cell stack 3FS, has a hydrogen regulating valve 40 interposed in the midway. In addition, fuel gas exhaust passage 34 leads to a water separator tank 41. The water separator tank 41 is provided with a level sensor 42 for detection of water amount, a water discharge valve 43 for exiting water to the outside, and nitrogen purge valve 44 for nitrogen gas to open to the atmosphere.

In addition, in the fuel cell system shown, a fuel gas recirculation pipe 50 is provided which connects fuel gas supply passage 33 and water separator tank 41. The fuel gas recirculation pipe 50 is provided with a recirculation pump 51 and is connected to an intermediate section to an intermediate section of fuel gas supply passage 33 via ejector 52.

In other words, this fuel cell system has a fuel recirculation line according to which exhaust fuel gas (off gas) from fuel cell stack FS is re-used and surplus hydrogen which has exited without being used for power generation within fuel cell stack FS is compulsorily fed back to fuel gas supply passage 33 through fuel gas recirculation pipe 50, recirculation pump 51 and ejector 52.

According to the fuel cell system of fuel recirculation method, by using recirculation pump 51 and ejector 52 in combination, for example, the area of pressure in which ejector 52 would not function will be compensated for by the operation of recirculation pump 51. Moreover, such a configuration in which only the ejector 52 is provided without the recirculation pump 52, excessive hydrogen exiting from fuel cell stack FS will be forcibly returned to fuel gas supply passage 33.

Cooling fluid recirculation passage 35 is intended to recirculate cooling fluid (cooling water) cooled by radiator 45 and is provided with a cooling fluid recirculation pump 46, a bypass passage 47 bypassing the radiator 45 and a three-way valve 48 connecting the recirculation path 35 and bypass passage 47.

When operating the fuel cell system described above, according to the operating method of the present invention, a supply pressure of reactant gas will be adjusted such that the gas pressure of diffuser portion in which frame and separator are arranged spaced apart will be higher than the gas pressure of diffuser portion in which frame and separator are in contact with each other through projections.

Figure 9:
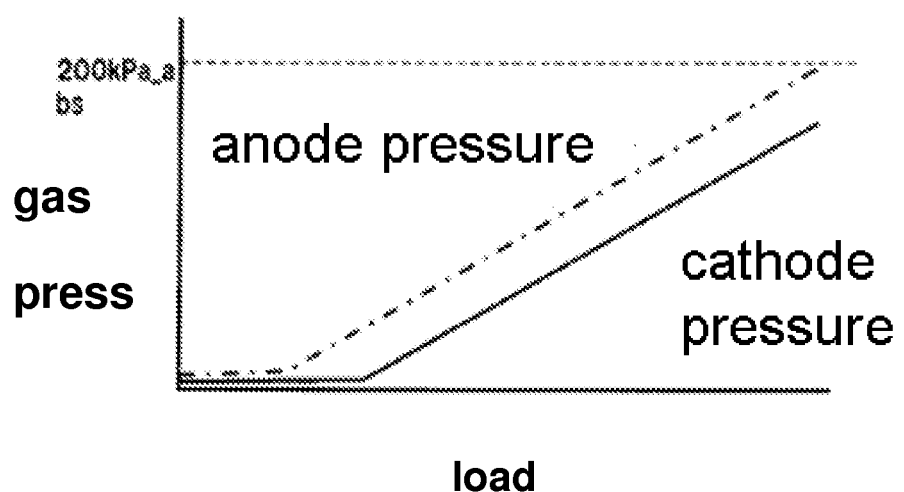
FIG. 9 is a graph showing the relationship between gas pressure and load.

In the fuel cell FC shown in FIGS. 4 through 7, it is at diffuser portion Da of the anode side where a separator and a spaced are spaced apart. Also, it is in the cathode side diffuser Dc where frame 1 and separator 3 are brought into contact by projection 5 (15). Therefore, in the method of operating a fuel cell system of the present invention, as shown in FIG. 9, the supply pressure of reactant gases will be adjusted such that the gas pressure of anode side diffuser portion Da will be higher than the gas pressure of cathode side diffuser portion Dc.

According to the above method of operation, in each fuel cell FC of a fuel cell stack FS, frame 1 is held by cathode side projections 5, 15 and an anode side gas pressure and thus deflection of the frame 1 (tenting) will be avoided. Therefore, as described above even at uneven dispersion or variation of flow rate in reactant gas (oxidizing gas, in particular), deflection of frame 1 or increase in pressure loss on the lower pressure side gas passage may be prevented.

Moreover, according to the operation method of the above described fuel cell system, in individual fuel cells FC, the contact pressure between the MEA and both separators 3, 3 is maintained properly. By maintaining the contact pressure, both the function of preventing increase in contact resistance and the function of addressing uneven dispersion of reactant gas flow will be fulfilled. Moreover, as in the above embodiment, due to a method in which a gas pressure of anode side diffuser Da will be made higher, then an easy control of pressure is advantageously made because fuel gas (hydrogen) is originally stored within a hydrogen tank 39 in a pressurized state.

Figure 10:
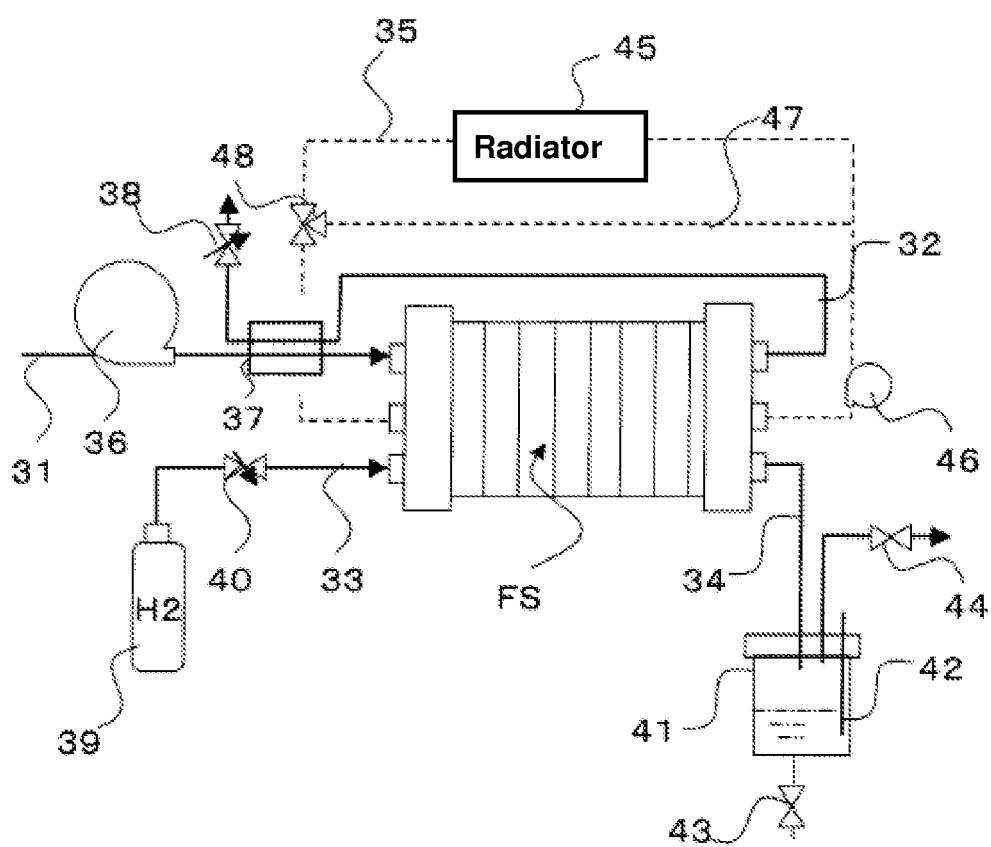
FIG. 10 is an explanatory diagram showing another example of a fuel cell system.

In the illustrated fuel cell system embodied in FIG. 10, as compared to the previously mentioned system in FIG. 8, fuel gas recirculation pipe (50), recirculation pump (51) and ejector (52) are omitted. In this fuel cell system, rather than using recirculation of an exhaust fuel gas containing hydrogen, fuel gas flows in one direction from the supply side to discharge side. Such a system is called anode dead-end system. Even in this fuel cell system, the same implementation and effect will be obtained as those in the previously described fuel cell system of fuel recirculation method.

Figure 11A:
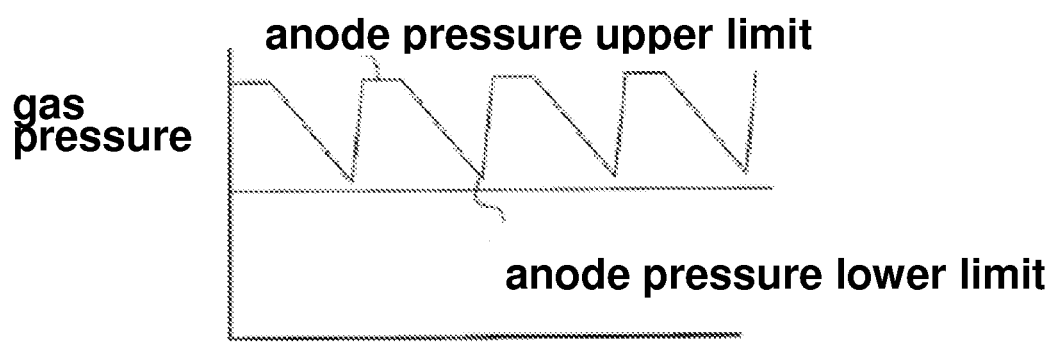
FIG. 11A is, in another embodiment of the method for operating a fuel cell system, a graph showing the relationship between gas pressure.

In the anode dead-end system of the above, after the start of power generation, a supply of fuel gas (hydrogen) is temporarily stopped by hydrogen regulating valve 40 while continuing power generation, and the pressure in fuel gas supply passage 33 will be reduced. Then, at a time in which the supply passage 33 provides a predetermined pressure, supply of fuel gas will be restarted by hydrogen regulating valve 40, and by way of the gas flow caused by the restart of supply of the fuel gas, water generated in the fuel cell FC will be discharged to water separator tank 41. In other words, the anode side gas pressure will fluctuate or pulsate during operation as shown in FIG. 11A.

Figure 11B:
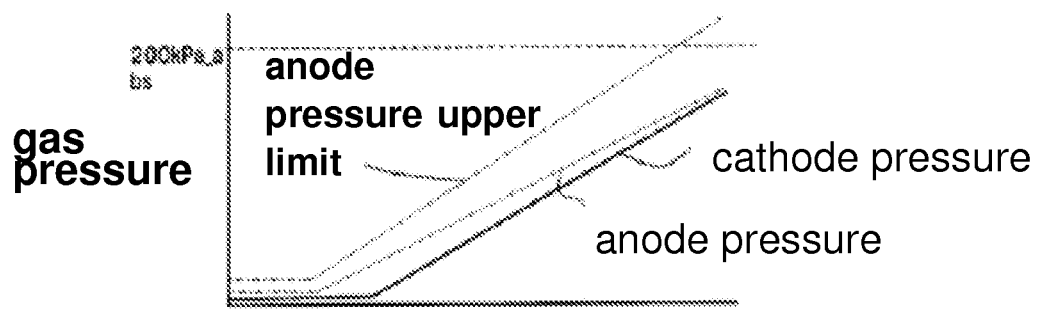
FIG. 11B is a graph showing the relationship between gas pressure and the load.

Thus, in the method of operation of a fuel cell system according to the present invention, when the gas pressure at the anode side pulsates, as shown in FIG. 11B, supply pressure of reactant gas will be adjusted for operation such that both the upper limit pressure and lower limit pressure limit in the anode side diffuser portion Da will be made higher than the gas pressure prevailing at cathode side diffuser portion Dc. This makes it possible to obtain the similar implementation/operation and effect of the previous embodiment.

Figure 12:
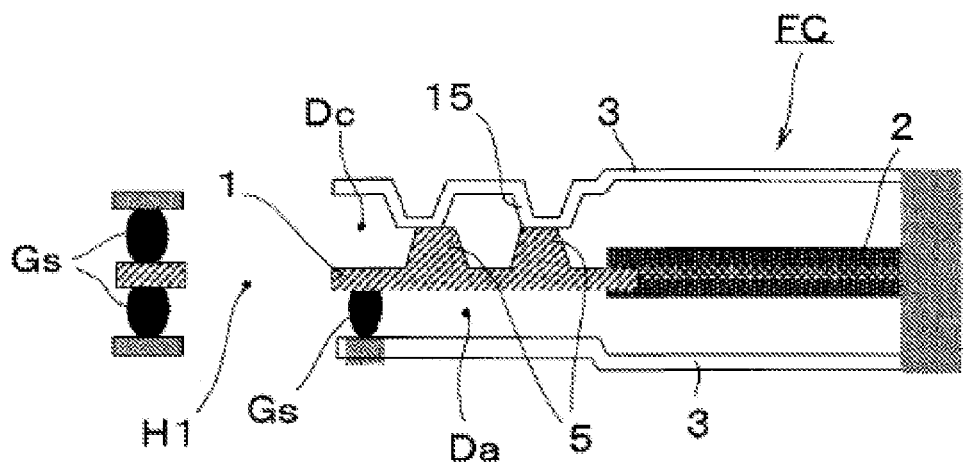
FIG. 12 is a cross-sectional view to explain still another embodiment of the fuel cell according to the present invention.
Figure 13:
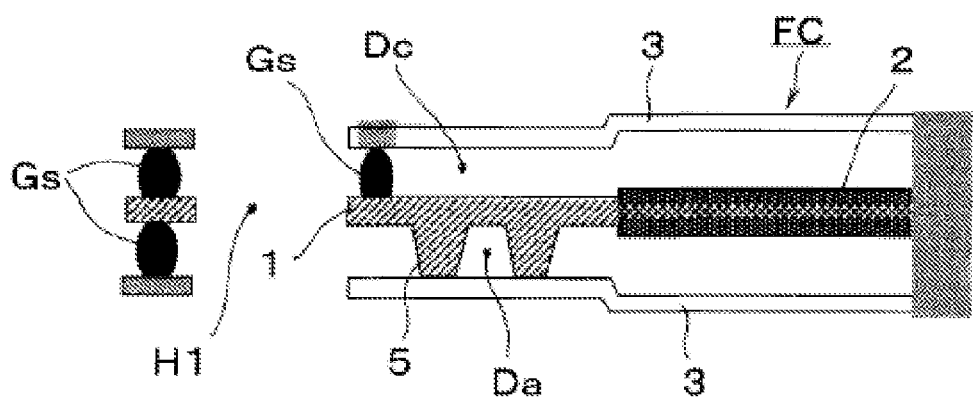
FIG. 13 is a cross-sectional view to explain yet another embodiment of the fuel cell according to the present invention.

FIGS. 12 and 13 explain still further two embodiments of the fuel cell according to the present invention. Note that the same parts of configuration, the same reference sign is attached and detailed explanation is accordingly omitted. In addition, FIG. 12 is a cross-sectional view of a hole at the position of the H3 for the fuel gas supply manifold.

In the fuel cell FC shown in FIG. 12, in the cathode side diffuser portion Dc, on both of the opposing frame 1 and separator 3, projections 5, 15 are provided for mutual contact. In the anode side diffuser portion Da, the opposing frame 1 and separator 3 are arranged with a space. In this way, the projections (5, 15) can be provided to both the frame 1 and a separator 3. In this case, in addition to the configuration shown in which projections 5, 15 are brought in contact to each other, another configuration may be available in which projection 5 of frame 1 and projection 15 of separator 3 are alternately arranged such that projection 5 of frame 1 contacts separator 3 while projection 15 of separator 3 contacts frame 1. The fuel cell of this embodiment also realizes the same implementation/operation and effect as that in the previous embodiment.

In the fuel cell FC shown in FIG. 13, as compared to the previous respective embodiments in which the cathode side diffuser portion Dc is provided with projections 5, 15, projection 5 is provided in an anode side diffuser portion Da for contacting separator 3. In addition, in the cathode side diffuser Dc, frame 1 and separator 3 are set apart from each other. In this instance, the projection may be provided, as in the previous respective embodiments, at least on either of frame 1 and separator 3.

In the fuel cell FC above described, as well, the same implementation/operation and effect may be obtained as the previous respective embodiments. In the fuel cell system comprising a fuel cell stack containing a lamination or stack of such fuel cell FC, supply pressure of reactant gas may be adjusted to operate such that the gas pressure at cathode side diffuser portion Dc is made higher than the gas pressure in anode side diffuser portion Da.

In the above fuel cell FC, as mentioned above, each component has a manufacturing tolerances and dimensional tolerances along with a slight deviation in thickness of the MEA over time and the like. In addition, such as those in the anode dead end system shown in previous FIGS. 10 and 11, when the anode side gas pressure pulsates, a pressure difference between anode side and cathode side generates and this tends to concentrate bending stress at the junction of frame 1 and MEA 2.

Figure 14:
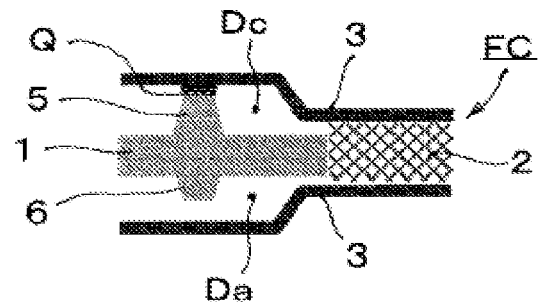
FIG. 14 is a cross-sectional view of essential parts showing a further embodiment of the fuel cell.

Thus, the fuel cell FC as shown in FIG. 14 is provided, in a diffusion portion D of either cathode side or anode side, with projection 5 on at least one of the opposing surfaces of frame 1 and separator 3 for engagement with the counterpart, and the counterpart and the tip of projection 5 are glued (reference sign Q). In addition, in the other diffuser portion D, frame 1 and separator 3 are arranged in spaced apart relationship.

In the fuel cell FC illustrated, on the cathode side (upper side in Figure) diffuser Dc, frame 1 is provided with projection 5 contacting separator 3, and separator 3 and the tip of projection 5 may be glued (sign Q). In the anode side (lower side in Figure) diffuser portion Da frame 1 and separator 3 are spaced apart. Note that the positions of cathode and anode may be reversed upside down.

For the adhesion between the separator 3 and projection 5, by taking into account the materials for both sides (metal and resin), a well-known and effective adhesive may be employed, and in addition an adhesion means such as ultrasonic welding is also applicable.

The projections 5 of this embodiment have a frusto-conical shape or truncated cone and molded integral with resin frame 1 and arranged with a preset interval as shown in FIG. 1. The projection 5 is not particularly limited in shape and the like and does not preclude other configurations as long as the distribution of reactant gas will not be hindered.

Further, in this embodiment, the anode side surface of frame 1 (lower surface in FIG. 14) is provided with a convex portion 6 similar in shape as projection 5. This convex portion 6 is lower in height than the cathode side projection 5 and forms a space to separator 3, and thus abuts on separator 3 to prevent excessive displacement when frame 1 and separator 3 displace in a mutually approaching direction.

In the fuel cell FC comprising the above configuration has frame 1 space apart from separator 3 in the anode side diffuser portion Da, thus, when constructed into a fuel cell stack FS, the pressurizing force in the stacking direction is applied mainly between the MEA 2 and separator 3 to ensure a sufficient contact pressure between MEA 2 and separator 3.

In addition, the fuel cell FC may absorb displacement in the thickness direction by the presence of a gap between frame 1 and separator 3 at the anode side diffuser portion Da. In other words, the fuel cell FC, even under the presence of dimensional or manufacturing tolerances of each component and a displacement over time in the thickness direction of MEA 2, they can be absorbed by the above described gap.

Therefore, the fuel cell FC, when configuring a fuel cell stack FS, may suppress deviations or differences in contact pressures of individual cells, gas flow rate, and other performances.

In addition, the fuel cell FC, at the cathode side diffuser portion Dc, by bonding the tip of projection 5 of frame 1 to separator 3, durability of MEA 2 containing frame 1 will be improved. In other words, even if the gas pressure of the anode side pulsates in the anode dead end system and thus a pressure difference between anode side and cathode side is generated, since projection 5 bonded to the separator 3 holds frame 1 on the separator 3, and suppresses the displacement of frame 1 even at a pressure on either cathode side or anode side being higher. Therefore, the fuel cell FC is capable of suppressing concentration of bending stress at the junction of frame 1 and MEA 2.

In this way, the fuel cell FC may absorb the displacement in the thickness direction by a gap provided between frame 1 and separator 3, and at the same time, hold frame 1 by projection 5 bonded to separator 3. This makes it possible both to optimize performance of each cell when configuring a fuel cell stack while improving durability of junction between frame 1 and MEA 2.

Figure 15:
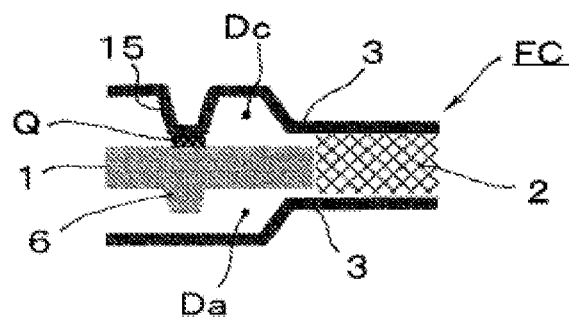
FIG. 15 is a cross-sectional view of essential parts of still another embodiment of the fuel cell.

FIG. 15 is a diagram illustrating yet another embodiment of the fuel cell of the present invention. The fuel cell FC shown has on separator 3 a projection 15 which is in contact with the counterpart frame 1 of the cathode side (upper side) diffuser Dc, and has a tip of projection 15 bonded (Q) to frame 1. Projections 15 are arranged as the projection in the previous embodiment with a predetermined interval so as not to interfere with the distribution of reactant gas. Further, frame 1 and separator 3 are positioned to be spaced apart in the anode side diffuser Da.

In the above fuel cell FC too, as in the previous embodiments, the fuel cell FC may absorb the displacement in the thickness direction by a gap provided between frame 1 and separator 3, and at the same time, hold frame 1 by projection 5 provided on separator 3. This makes it possible both to optimize performance of each cell when configuring a fuel cell stack while improving durability of junction between frame 1 and MEA 2.

Figure 16A:
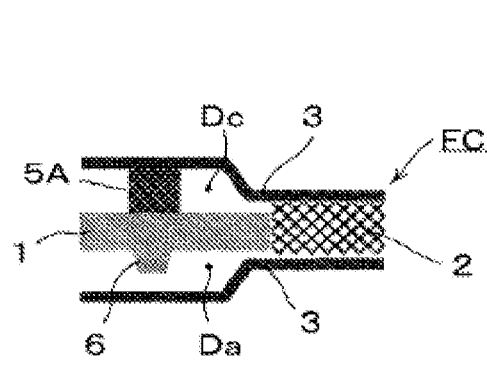
FIG. 16A is a cross-sectional view of essential parts of yet another embodiment.

FIGS. 16A and B are diagrams illustrating still another embodiment of the fuel cell of the present invention. The fuel cell FC shown in FIG. 16A has on at least one of surfaces of opposing frame 1 and separator 3 a projection 5A which is in contact with the counterpart in the cathode side diffuser Dc, and has the projection 5A bonded by an adhesive interposed between frame 1 and separator 3. These projections 5A are also arranged with a predetermined interval so as not to interfere the distribution of reactant gas. Further, in the anode side diffuser Da, frame 1 and separator 3 are arranged spaced apart from each other.

Figure 16B:
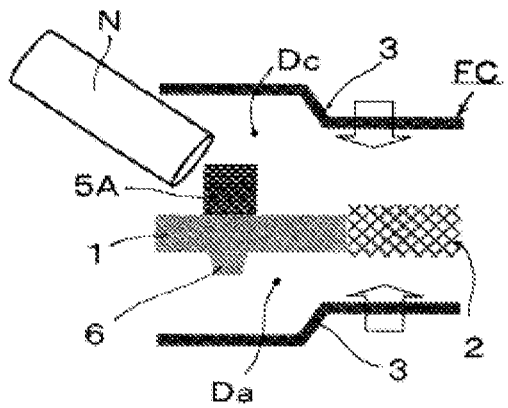
FIG. 16B is a cross-sectional view to explain the formation of projection in a dissembled state of essential parts.

The adhesive forming protrusion 5A can be selected from materials that are specifically superior in the adhesive force. It can be, for example, epoxy-based materials are used. Projection (adhesive) 5A may be molded in advance into a predetermined shape, or more preferably, as shown in FIG. 16B, may be discharged from a nozzle N of adhesive supply unit to coat on frame 1. In addition, since projection (adhesive) 5A will be adhered to both frame 1 and separator 3 by joining each other, this may be held equivalent to the configuration in which the counterpart separator 3 is bonded to the tip. It should be noted that, contrary to the illustrated example, separator 3 may well be provided with projection 5A (i.e., coated), as a matter of course.

Figure 17A:
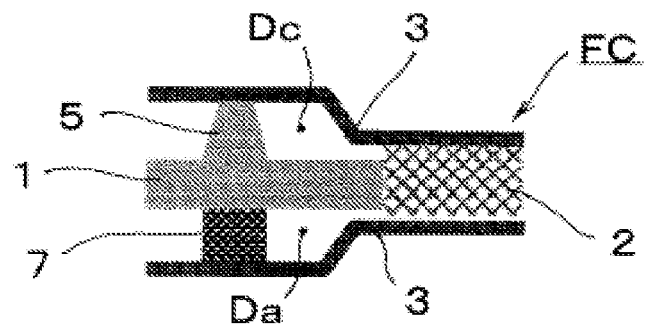
FIG. 17A is a cross-sectional view of essential parts of still another embodiment of the fuel cell.
Figure 17B:
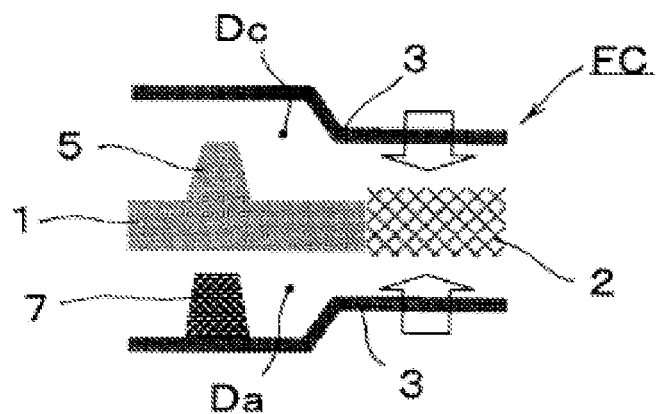
FIG. 17B is a cross-sectional view of essential parts in a dissembled state having a separator with an elastic body.
Figure 17C:
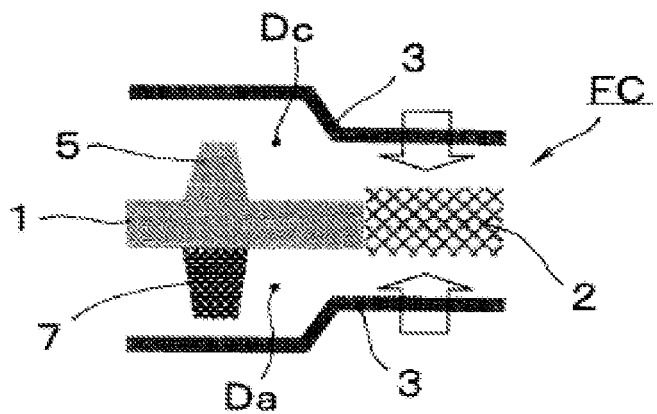
FIG. 17C is a cross-sectional view of essential parts having a frame with an elastic body.

Even in the fuel cell FC above, the same effects as the previous embodiments may be achieved. In addition, since projection 5A is formed by an adhesive, projection of frame 1 or that of separator 3 may be abolished for a simplified shape. Moreover, along with step of providing gas seal (see FIG. 1), projection 5A may be formed to contribute to the improvement of productivity and to reduction in manufacturing cost. It should be noted that, when forming both gas seal Gs and projection 5A in the same step, it is desirable to use material for adhesive suitable for both usage such as silicone rubber, fluorine rubber, and polyolefin, for example FIGS. 17A-C are diagrams illustrating still another embodiment of the fuel cell of the present invention. The fuel cell FC shown in FIG. 17A has in either of cathode side diffuser or anode side diffuser D on at least one surface of opposing frame 1 and separator 3, an elastic body 7 is interposed between frame 1 and separator 3. The elastic bodies 7 are arranged, as in the case of projections in previous embodiments, with a predetermined interval so as not to interfere with distribution of reactant gas.

More specifically, fuel cell FC has in the cathode side diffuser Dc a projection 5 on frame 1 which is in contact with separator 3, and, in the anode side diffuser Da, an elastic body 7 interposed between and in contact with both frame 1 and separator 3. The elastic body 7 may be provided on separator 3, as shown in FIG. 17B, or on frame 1 as shown in FIG. 17C.

In addition, the elastic body (7) may be pre-formed by molding into a predetermined shape, but, more preferably, may be coated in the molten state and, after curing, may be formed by adhesive with elasticity. The adhesive forming the elastic body 7 may be a material such as silicone rubber, fluorine rubber, or polyolefin rubber, for example. Even in this elastic body (adhesive) 7, as in the case of projections (reference sign 5A in FIG. 16), either frame 1 or separator 3 is coated, and, after curing, attached to the counterpart by joining frame 3 and separator 3.

In the above fuel cell C, in contrast to the embodiments in FIGS. 14 to 16, in which a gap between the anode side separator 3 and frame 1 may absorb the displacement in the thickness direction, the anode side elastic body 7 absorbs the displacement in the thickness direction. In addition, fuel cell C holds frame 1 by projection 5 of frame 1 and elastic body 7. This makes it possible both to optimize performance of each cell when configuring a fuel cell stack FS while improving durability of junction between frame 1 and MEA 2.

In addition, the cell FC fuel cell above, since it was formed by elastic body 7 in adhesive having elasticity after curing, forming of elastic body 7 along with the step of providing gas seal Gs may be possible to contribute to the improvement of production efficiency and reduction of production cost. In addition, the cell FC fuel cell described above, only by bringing projection 5 or elastic body 7 into contact with the counterpart component such functions as displacement absorption, holding of frame 1 may be achieved, it would be sufficient that the adhesive has a low adhesive strength.

Therefore, along with the simplification or abolishment of surface treatment of adhesive surface, inexpensive adhesive may be used to achieve even further reduction in manufacturing cost.

Figure 18A:
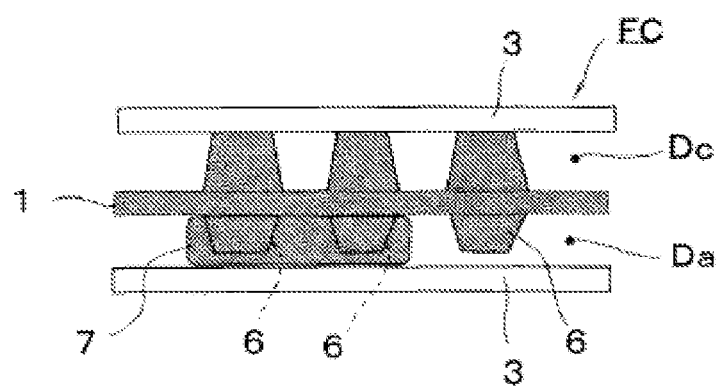
FIG. 18A is a cross-sectional view of essential parts of still other embodiment of the fuel cell.

FIGS. 18A and B are diagrams illustrating still another embodiment of the fuel cell of the present invention. The fuel cell FC shown in FIG. 18A has, in cathode side diffuser Dc on frame 1, an projection 5 in contact with separator 3, and, in the anode side diffuser Da, an elastic body 7 between frame 1 and separator 3, which is in contact with both components.

Figure 18B:
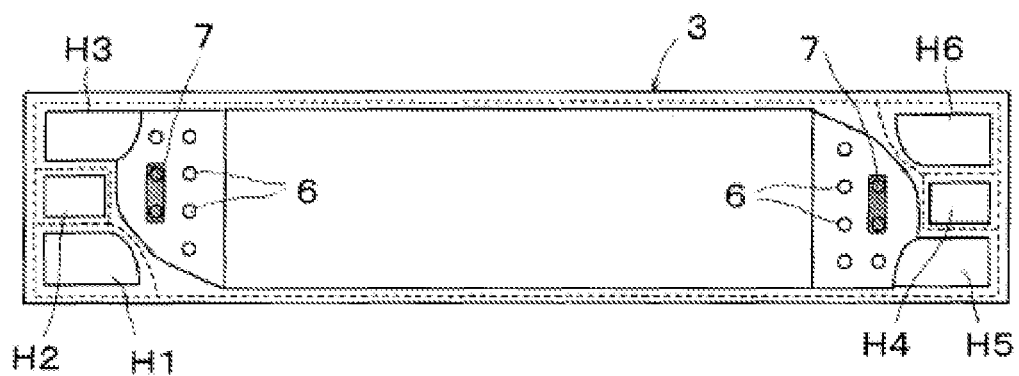
FIG. 18B is a plan view of an anode side separator.

In addition, in this embodiment, as shown in FIG. 18B as well, the anode side separator 3 has a convex portion 6 lower in height than projection 5, as in the embodiments in FIGS. 14 to 16. In the illustrated embodiment, an elastic body 7 is provided to cover two of convex portions 6.

As described above, the elastic body 7 may be pre-formed by molding into a predetermined shape, but may be coated in the molten state and, after curing, may be formed by adhesive with elasticity. The elastic body 7, when formed with adhesive, may be formed by coating adhesive so as to cover multiple convex portions 6 and by a subsequent curing. This makes it possible to secure a broad adhesive area while improving the "snapping" of elastic body 7 against convex portion 6 for a sufficient adhesive strength.

It should be noted that, although the above elastic body 7 may be formed in relation to a single convex portion 6, or to two or more of convex portions 6, the size and shape should be selected so as not to interfere with distribution of reactant gas.

Thus, in the fuel cells FC shown in the above FIGS. 14 to 18, as in each embodiment above, a function that the contact pressure between MEA 2 and both separators 3, 3 are kept in good condition for preventing increase in contact resistance as well as another function for coping with the unevenness or variations of reactant gas flow will be achieved. This makes it possible both to optimize performance of each cell when configuring a fuel cell stack FS while improving durability of junction between frame 1 and MEA 2. Accordingly, in the fuel cell stack FS composed of a plurality of fuel cells C in a stacked state, the performance in terms of power generation and durability of individual cells is made uniform and an stable operation over a long period time is possible.

In the fuel cell according to the present invention, the structure or configuration is not intended to be limited to each of the above embodiments, but, as long as within the range without departing from the gist of the present invention, shape, the number, material and the like of respective components may be changed depending upon specific application of the present invention. For example, in the embodiments shown in FIGS. 14 to 18, an example is shown in which the locations of projection and those of elastic body coincide in anode and cathode sides, these may be staggered to each other in a plan view. Also, the configurations of each of above embodiments may be combined.

The invention claimed is:

1. A fuel cell comprising:
a membrane-electrode-assembly (MEA) having a cathode side and an anode side;
a frame body around a periphery of the MEA;
an anode side separator and a cathode side separator, together sandwiching the frame and MEA;
a primary gas seal between a periphery portion of the frame and a periphery portion of both the cathode side separator and the anode side separator;
a cathode side diffuser between the frame and the cathode side separator and an anode side diffuser between the frame and the anode side separator, each distributing reactant gas;
a secondary gas seal between the frame and one of the anode side separator and the cathode side separator and positioned closer to the MEA than the primary gas seal; and
a plurality of projections provided on a side of the frame opposite the secondary gas seal, the plurality of projections extending from at least one of the surfaces of the frame and an adjacent separator and contacting an opposing surface or projection of the other of the surfaces, the plurality of projections positioned closer to the MEA than the secondary gas seal at spaced intervals along a side of the MEA and configured to not interrupt gas distribution, wherein the other of the cathode side diffuser and anode side diffuser has a gap between the frame and the adjacent separator.

2. The fuel cell as claimed in claim 1, wherein a tip of each of the plurality of projections is provided to contact the opposing surface and the tip of each of the plurality of projections is bonded to the opposing surface.

3. The fuel cell as claimed in claim 2, wherein each of the plurality of projections is formed by an adhesive interposed between the frame and the adjacent separator.

4. A fuel cell stack characterized in that the fuel cell stack is composed of a plurality of fuel cells described in claim 1 stacked on one another.

5. A fuel cell system characterized by having the fuel cell stack claimed in claim 4.

6. An operating method of a fuel cell system comprising:
   adjusting a supply gas pressure of reactant gas of a fuel cell to a first gas pressure in one of an anode side diffuser and a cathode side diffuser having a gap, wherein the first gas pressure is higher than a second gas pressure in another of the anode side diffuser and the cathode side diffuser having a plurality of projections, wherein the fuel cell comprises:
   a membrane-electrode-assembly (MEA) having a cathode side and an anode side;
   a frame body around a periphery of the MEA;
   an anode side separator and a cathode side separator, together sandwiching the frame and MEA;
   a primary gas seal between a periphery portion of the frame and a periphery portion of both the cathode side separator and the anode side separator;
   a secondary gas seal between the frame and one of the anode side separator and the cathode side separator and positioned closer to the MEA than the primary gas seal; and
   a plurality of projections provided on a side of the frame opposite the secondary gas seal, the plurality of projections extending from at least one of the surfaces of the frame and an adjacent separator and contacting an opposing surface or projection of the other of the surfaces, the plurality of projections positioned closer to the MEA than the secondary gas seal at spaced intervals along a side of the MEA and configured to not interrupt gas distribution, wherein the other of the cathode side diffuser and anode side diffuser has a gap between the frame and the adjacent separator.

7. The fuel cell as claimed in claim 1, wherein the plurality of projections is provided on the surface of the frame in the cathode side diffuser.

8. The fuel cell as claimed in claim 1, wherein the plurality of projections is provided on the surface of the cathode side separator in the cathode side diffuser.

\* \* \* \* \*